United States Patent
Xing et al.

(10) Patent No.: US 8,989,092 B2
(45) Date of Patent: Mar. 24, 2015

(54) SIGNALING CONTROL FOR REDUCED SIGNALING STORM AND IMPROVED USER EQUIPMENT BATTERY LIFE

(71) Applicant: Futurewei Technologies, Inc., Plano, TX (US)

(72) Inventors: Shuqing Xing, San Diego, CA (US); Yuqiang Tang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 189 days.

(21) Appl. No.: 13/645,354

(22) Filed: Oct. 4, 2012

(65) Prior Publication Data

US 2014/0098740 A1 Apr. 10, 2014

(51) Int. Cl.
H04W 4/00 (2009.01)

(52) U.S. Cl.
CPC .................................. H04W 4/001 (2013.01)
USPC ........................................................ 370/328

(58) Field of Classification Search
CPC .................................................. H04W 76/00
See application file for complete search history.

(56) References Cited

U.S. PATENT DOCUMENTS

2005/0125677 A1* 6/2005 Michaelides ................. 713/185
2007/0149137 A1* 6/2007 Richardson et al. ............ 455/68
2011/0280198 A1* 11/2011 Kim et al. ..................... 370/329
2011/0299454 A1* 12/2011 Krishnaswamy ............. 370/328
2012/0151503 A1* 6/2012 Clarke .......................... 719/318
2012/0221384 A1* 8/2012 Avadhanam et al. ........ 705/14.4
2013/0191544 A1* 7/2013 Caldeira de Andrada et al. ............................. 709/226

OTHER PUBLICATIONS

Qualcomm®, "Managing Background Data Traffic in Mobile Devices," Qualcomm Incorporated, Jan. 2012, 16 pages.
Seven®, Seven Open Channel™, "Network to Device Optimization," Feb. 2011, 15 pages.
Nokia Siemens Networks Smart Labs, "Understanding Smartphone Behavior in the Network," 2011, 12 pages.
3GPP TR 22.801, V0.2.0, 3rd Generation Partnership Project; Technical Specification Group Services and System Aspects; Study on non-MTC Mobile Data Applications Impacts, Release 11, May 2011, 14 pages.

* cited by examiner

Primary Examiner — Chi H Pham
Assistant Examiner — Fahmida Chowdhury
(74) Attorney, Agent, or Firm — Conley Rose, P.C.; Grant Rodolph; Brandt D. Howell (57) ABSTRACT

A UE comprising a transmitter configured to transmit data from a network; and a processor coupled to the transmitter and configured to execute an application that performs signaling with a wireless network via the transmitter, determine that the application is assigned to an application group based on signaling requirements of the application, and determine that the application group is associated with a connection parameter that limits network signaling of all applications in the group, and initiate a network signaling link for the application according to the connection parameter.

23 Claims, 7 Drawing Sheets

SIGNALING CONTROL FOR REDUCED SIGNALING STORM AND IMPROVED USER EQUIPMENT BATTERY LIFE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User Equipment (UE), such as mobile phones, mobile computers, and similar devices, may connect to a network via a base station, an Evolved Universal Terrestrial Radio Access Network (E-UTRAN) node B (eNB), and/or similar devices. Communications between the network and the UE may transition through periods of increased activity and periods of minimal activity. During periods of minimal activity, the network may release the connection to the UE and associated network resources, which may allow such network resources to be allocated to other UEs and allow the UE to save battery power.

Users of modern UEs are increasingly utilizing applications, such as social networking, geolocation, online games, etc., which may require signaling on a more frequent timescale than was typical of traditional UE to network communications. Consistent signaling triggered by such applications may create increased network traffic from a UE, which may result in increased battery power usage by that UE. When multiple UEs engage in such consistent signaling at a given time, the resulting constant traffic may result in a so called signaling storm, which may over employ network resources and may result in loss of connectivity and/or poor quality connectivity across the network.

SUMMARY

In one embodiment, the disclosure includes a UE comprising a transmitter configured to transmit data from a network; and a processor coupled to the transmitter and configured to execute an application that performs signaling with a wireless network via the transmitter, determine that the application is assigned to an application group based on signaling requirements of the application, and determine that the application group is associated with a connection parameter that limits network signaling of all applications in the group, and initiate a network signaling link for the application according to the connection parameter.

In another embodiment, the disclosure includes a communication device comprising: a memory, configured to store an application group database including an application group and a connection parameter associated with the application group and a processor, configured obtain predictive traffic models for applications based on field data that comprises historical signaling data associated with each application, use the predictive traffic models related to various applications to assign an application to an application group, assign at least one connection parameter to the application group, and wherein the connection parameter limits network signaling of all the applications assigned to the group to which the connection parameter pertains.

In yet another embodiment, the disclosure includes a method comprising assigning a plurality of applications that perform network signaling when executed by a UE to a plurality of application groups based on signaling requirements of the applications, assigning to each application group at least one connection parameter that limits network signaling of all applications assigned to the application group, and storing the application group assignments and the connection parameter assignments in an application group database.

In yet another embodiment, the disclosure includes a method comprising initiating an application on a user equipment, determining that the application belongs to an application group associated with a connection parameter, wherein the connection parameter comprises a shared transmission delay timer limiting network signaling of all applications in the application group, and initiating a network signaling link for the application in the application group based on expiration of the shared transmission delay timer.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an apparatus and method that may implement connection parameters to govern transmissions related to UE applications. Applications may be assigned to application groups and/or subgroups based on each application's connection requirements, which may allow signaling to be limited and/or prioritized based on application need via the use of group/subgroup wide connection parameters. The assignment of applications into groups/sub-groups and the implementation of connection parameters associated with each group/subgroup may be implemented by the UE or implemented by the network and transmitted to the UE. The number and nature of such groups, subgroups, and/or connection parameters may be modified by the network based on data analysis of the behavior of specific UE types, operating system types, UE signaling requirements, application historical behavior, and/or impact on radio link conditions. The network and/or UE may maintain an application database to assist in application group assignment. In addition or in the alternative, a UE may be allowed to modify a UE's application group assignments based on a user's request. In addition and/or in the alternative, the UE may make independent application group/subgroup assignments based on application communication requirements such as Quality of Service (QoS), bandwidth, heartbeat message requirements, etc.

Figure 1:
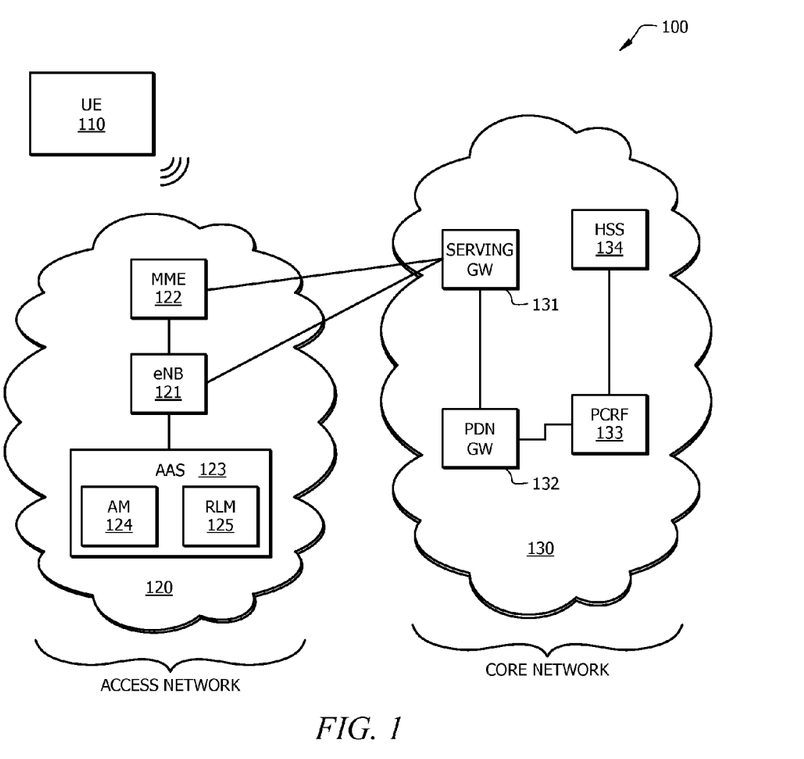
FIG. 1 is a schematic diagram of an embodiment of a network for supporting UE connectivity.

FIG. 1 is a schematic diagram of an embodiment of a network 100 for supporting UE connectivity. Network 100 may be a long term evolution (LTE) network and may comprise an access network 120 coupled to a core network 130. A UE 110 may connect to the core network 130 via the access network 120. The core network 130 may forward voice and/or data communications from the UE 110, via the access network 120, to other telecommunications networks and vice versa.

The access network 120 may comprise a base station such as an eNB 121 and a mobility management entity (MME) 122. The eNB 121 may comprise a communications tower and may be configured to establish a radio link with the UE 110 and wirelessly transmit voice and/or data messages to and from the UE 110 over the radio link. The radio link may be initiated by the network or upon request of the UE 110. The MME 122 may be coupled to the eNB 121 and may act as a control node for the access network 120. The MME 122 may be configured to track the movement of the UE 110 and manage the establishment of bearer connections between the UE 110 and various eNBs 121 as the UE 110 moves geographically from tower to tower and/or network to network. The MME 122 may also manage procedures to page the UE 110 and manage retransmissions in case of lost packets. The MME 122 may also manage user authentication on behalf of the UE 110 and select the UE's 110 entry point into the core network 130. In some embodiments, the MME 122 may be located in the core network 130 instead of the access network 120.

The core network 130 may comprise a serving gateway (GW) 131, a packet data network (PDN) GW 132, a policy charging and rules function (PCRF) node 133, and a Home Subscriber Server (HSS) 134, which may be coupled as shown in FIG. 1. The serving GW 131 may act as the UE's 110 entry point to the core network 130 by routing and/or forwarding data packets from the core network 130 to the UE 110 via the access network 120. The serving GW 131 may also act as an anchor during inter-eNB 121 handovers and may terminate downlink paths and trigger paging when data arrives for a UE 110 in an idle state as discussed below. The serving GW 131 may also store parameters related to internet protocol (IP) bearers and routing. The PDN GW 132 may act as a point of connectivity between the UE 110 and a PDN. The PDN GW 132 may perform policy enforcement, packet filtering, lawful interception, and packet screening between the PDN and the UE 110. The PCRF node 133 may act as an authentication, authorization, and accounting (AAA) server and manage network provisioning, user accounts, billing, and network policy enforcement. The HSS 134 may comprise a database that contains user-related and subscription related data. The HSS 134 may function in conjunction with the PCRF node 133 and/or the MME 122 to perform AAA support mobility management, and support call and session establishment with the UE 110.

Network 100 may further comprise an application analysis server (AAS) 123, which may be positioned in the access network 120 and may be coupled to the eNB 123. In an alternative embodiment, the AAS 123 may be position in the core network 130 and coupled to the serving GW 132. The AAS 123 may be configured create application groups and/or subgroups for various UE applications that transmit data through the network 100. AAS 123, AM 124 and/or RLM 125 may be implemented in hardware, software, and/or firmware. The AAS 123 may comprise an Application Manager (AM) 124 which may analyze data traffic patterns and use historical application traffic statistics and/or application connection requirements (e.g. signaling requirements measured by the eNB 121) as criteria to assign each application to an application group. The AAS 123 may also comprise a Radio Link Manager (RLM) 125, which may assign connection parameters that apply to all members of an application group. The RLM 125 may be implemented via a Open Mobile Alliance Device Management (OMA-DM) protocol. The application groups and the associated parameters may be transmitted to the UE through network 100 initiated or UE 110 initiated OMA-DM sessions. The AM 124 may also employ subgroups to allow assignment of connection parameters that apply to a specific subgroup, but not to the entire group. A connect parameter may be any limitation on signaling that applies to all applications in an application group and/or subgroup. For example, connection parameters may comprise maximum allowed bandwidth, transmission consolidation rules, application heartbeat limitations, shared transmission delay timers, etc.

The AAS 123 may transmit the group assignments of applications and associated connection parameters to UE 110. UE 110 may then manage the signaling of all applications by application group/subgroup. The management by group/subgroup may comprise implementing the connection parameters for the group/subgroup and/or overriding each application's pre-programmed connection requirements. For example, all applications in a group may share a single transmission delay timer, in which case a radio link for an application group/subgroup may only be initiated by the UE at the expiration of the delay timer. The use of a shared transmission delay timer may require all service requests from every application in the group to occur substantially contemporaneously with the expiration of the transmission delay timer and the initiation of the shared radio link. The use of a shared transmission delay timer may prevent the need for repeated transitions by the UE 110 from an idle state to a connected state. The shared delay timer may also be used by the network or by the UE to negotiate connection requirements imposed by network elements that act as servers for applications in an application group/subgroup. For example, network initiated application updates for a first application may be scheduled to occur concurrently with updates from a plurality of other applications, made to wait upon the occurrence of a specific event such as the UE entering a connected state, and/or disabled. As another example, a first application group may be granted a shorter transmission delay timer than a second application group, which may allow the applications in the first group to transmit data more frequently than applications in the second application group based on the transmission needs of each group. As another example, application groups/ subgroups may be governed by a maximum bandwidth parameter that may cause the UE 110 to allocate bandwidth availability based on application group/subgroup membership. As yet another example, a connection parameter may be used to prevent the transmission of unnecessary and/or unnecessarily frequent heartbeat messages from applications in an application group/subgroup.

The AAS 123 may continue to analyze signal traffic over network 100 and may update application group/subgroup assignments, update connection parameters, and perform optimization based on an analysis of network traffic patterns as needed to increase overall network efficiency. Additionally and/or alternatively, a user of a UE 110 may be allowed to register an application with the network, modify application group assignments, and/or create user specific application groups based on the user's needs. Additionally and/or alternatively, the UE 110 may receive application group assignments, connection parameters, and/or application group assignment rules from the network 100 (e.g via OMA-DM), from a user (e.g. via user input), or such assignments, parameters, and/or rules may be pre-loaded into the UE 110 by a service provider and/or manufacturer. Additionally and/or alternatively, the UE 110 may update application group assignments, connection parameters, and/or application group assignment rules based on radio link conditions, QoS requirements, models received from the network 100, etc.

Figure 2:
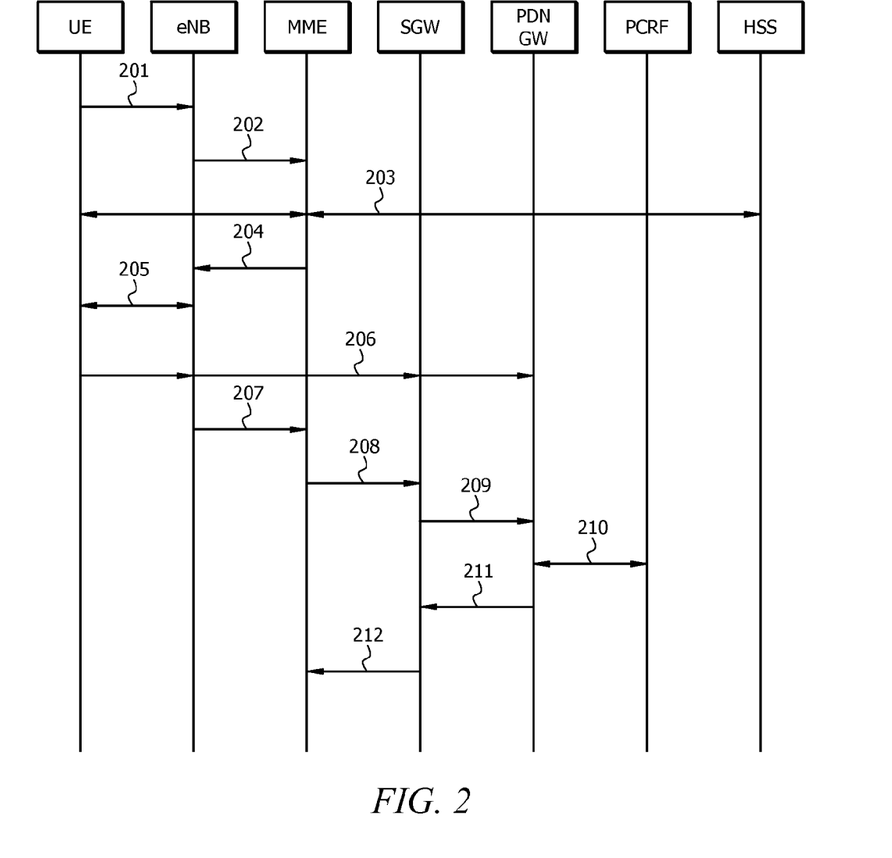
FIG. 2 is a protocol diagram of an embodiment of a method of communication signaling in a network.

FIG. 2 is a protocol diagram of an embodiment of a method 200 of communication signaling in a network, such as network 100. The signaling of method 200 may be performed between a UE, such as 110, and a network when transitioning a UE from an RRC idle state to an RRC connected state. Upon determining that the UE wishes to transmit uplink data to the network, the UE may transmit a network access server (NAS) service request 201 to an eNB. The eNB may then forward a corresponding NAS service request 202 to an MME. The MME may transmit authentication messages 203 to the UE and the HSS to complete UE authentication. The MME may transmit an initial context setup request message 204 to the eNB. The eNB may then use the data from the initial context setup request message 204 to establish a radio bearer 205 between the eNB and the UE. The UE may then transmit the uplink data 206 to a PDN GW via the eNB and the serving gateway. The eNB may then transmit an initial context setup complete message 207 to indicate that the bearer between the eNB and the UE has been established. The MME may then transmit a modify bearer request 208 to the serving GW. The modify bearer request 208 may include information about the radio bearer 205, including whether a handover from another eNB occurred as part of the radio bearer establishment 205. If a handover occurred, the serving GW may transmit a modify bearer request 209 to the PDN GW to indicate that subsequent data should be transmitted to the UE through the radio bearer 205 via the eNB. The PDN GW may then transmit a Policy and Charging Enforcement Function (PCEF) initiated IP Connectivity Access Network (IP-CAN) session modification message 210 to a PCRF to perform any binding updates associated with the new bearer 205. The PDN GW may then transmit a modify bearer response 211 to the Serving GW. The Serving GW may then transmit a modify bearer response 212 to the MME to complete the bearer modification.

As shown in FIG. 2, the transmission of a single data packet between a UE and a network may require that many signals be transmitted, not only between the UE and the network, but between components in the network as well. For example, in network 100 twelve separate messages may be sent to transition the UE from an idle state to a connected state and allow a single data packet to be transferred from the UE to the PDN GW for further transmission. Other networks may require additional signaling depending on the embodiment. In addition to the signaling overhead, transitioning to an active state may reduce UE battery life. UEs that execute applications that require consistent data transmissions, such as web browsers, weather programs, news update programs, social networking programs, email programs, voice over IP (VoIP), geo-location services, online games, instant messaging, etc., may require repeated state transitions, may rarely enter the idle state, and may require repeated network signaling. Constant state transitioning and signaling may result in reduced UE battery life and significantly increased network traffic. When many UEs engage in the use of these applications, the resulting network signaling increase, referred to as a signaling storm, may overburden network resources and effectively prevent network resource sharing among UEs.

Figure 3:
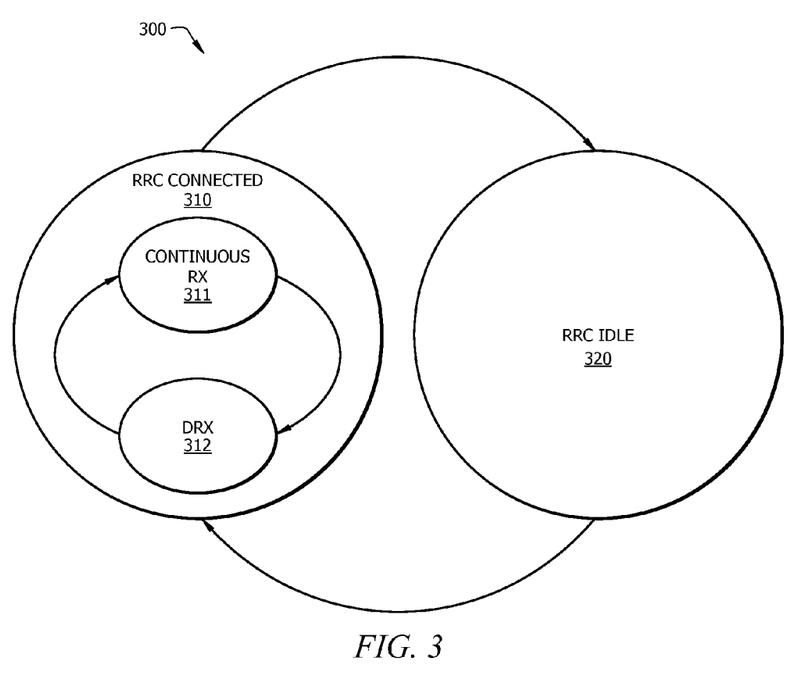
FIG. 3 is an embodiment of a connection state diagram for a UE.

FIG. 3 is an embodiment of a connection state diagram 300 for a UE, such as UE 110. During the course of communication with the network, a UE may be placed into a Radio Resource Control (RRC) connected state 310 and/or a RRC idle state 320. The RRC connected state 310 may further comprise a continuous reception (RX) substate 311 and a discontinuous reception (DRX) substate 312. The UE may transition from state to state over time based on the actual and/or project communication needs of the UE. The UE's transition may be triggered by the UE and/or managed by the network.

The UE may be placed in the continuous RX substate 311 of the RRC connected state 310 when actively communicating with the network. When in the continuous RX substate 311, the UE may continuously transmit and receive data packets/frames to and from the network. After active communication between the UE and the network ceases, the UE and network may continue to communicate through keepalive messages, which may be continuously exchanged while the UE is in the continuous RX substate 311. The UE and/or network may employ inactivity timers for state/substates 310-312. Once active communication ceases, the inactivity timer associated with the continuous RX substate 311 may be initiated. If the activity timer expires without further active communication, the UE may be transitioned to the DRX substate 312. If active communication is required, the activity timer may be reset.

When in the DRX substate 312, the UE may continue to transmit keepalive messages, but the frequency of such keepalive message transmissions may be reduced (e.g. transmitted discontinuously) as required by additional system timers. The reduced transmission of keepalive messages may reduce UE power usage and may reduce usage of network resources. The inactivity timer associated with the DRX substate 312 may be initiated when the UE enters the substate. If active communication between the UE and network is required prior to the expiration of the inactivity timer, the UE may be transitioned back to the continuous RX substate 311. If the DRX substate 312 activity timer expires without additional active communication, the UE may be transitioned to the RRC idle state 320.

When in RRC idle state 320, the UE may disconnect from the network, which may result in releasing network communication resources for use in connection with other UEs. The network disconnection may also result in significant power savings for the UE. When in RRC idle state 320, the UE may monitor a paging channel in a discontinuous manner as governed by additional system timers. Mobility management may also be transferred to the UE when in RRC idle state 320. Upon receiving a paging signal from the network indicating the need to receive data or upon determining that the UE desires to transmit data to the network, the UE may be transitioned to the RRC connected state 310 and/or continuous RX substate 311 to allow an active communication to take place. Application group assignments, groups assignment rules, and/or connection parameters may be designated and/or updated by the UE and/or the network as discussed above regardless of UE state at a specified time (e.g. RRC connected state 310, RRC idle state 320, and/or sleep or other states).

Figure 4:
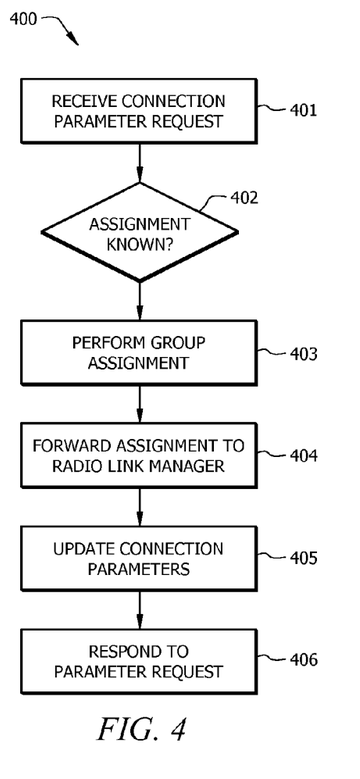
FIG. 4 is a flowchart of an embodiment of a method of responding to a request for application connection parameters.

FIG. 4 is a flowchart of an embodiment of a method 400 of responding to a request for application connection parameters. At step 401, an AAS may receive a request to provide an application group/subgroup assignment and/or connection parameters for an application. For example, a UE executing the application may transmit such a request to the AAS via the network. The AAS may proceed to decision box 402 and determine whether the application has been previously assigned to an application group/subgroup. The AAS may proceed to step 404 if the application has been assigned to a group or to step 403 if the application has not been assigned to a group. At step 403, the AAS may forward information identifying the application to the AM. The AM may perform a group and/or subgroup assignment for the application, store the assignment in a database, return the assignment to the AAS, and the AAS may proceed to step 404. At step 404, the AAS may forward the application group assignment to the Radio Link Manager and proceed to step 405. At step 405, the RLM may obtain any connection parameters related to the application group from a database. The RLM may also update connection parameters as required by network policy. The RLM may transmit the connection parameters related to the application group to the AAS and proceed to step 406. At step 406, the AAS may respond to the parameter request of 401 by transmitting the application's application group assignment and/or the connection parameters related to the application group to the UE via the network.

Figure 5:
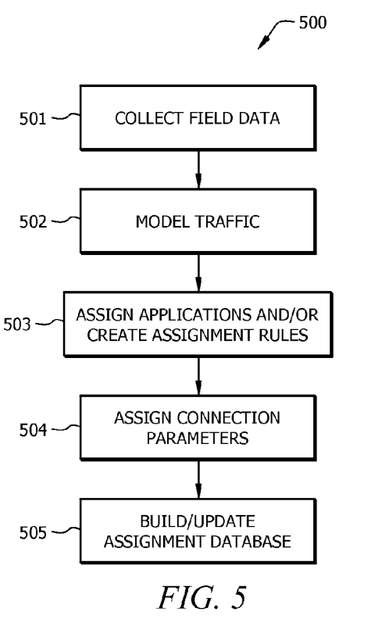
FIG. 5 is a flowchart of an embodiment of a method of performing an application group/subgroup assignment.

FIG. 5 is a flowchart of an embodiment of a method 500 of performing an application group/subgroup assignment, for example application group/subgroup assignment 403. At step 501, the AAS may collect field data from the network. Field data may be any measured network traffic data such as data related to an application or group of applications, a type/brand/model of UE, a geographic area, a date/time range, or any other network traffic data. For example, the AAS may collect all network traffic data for transmissions related to a specified application in a specified geographic area, over a specified time period. As another example, the AAS may obtain network traffic data for all application transmissions by a type of UE over a specified period of time. Once the appropriate data is collected, the AAS may proceed to step 502. At step 502, the AAS may perform traffic modeling based on the field data. For example, the AAS may generate predictive traffic models based on the impact a specified application's transmissions had on radio link conditions (e.g. Random Access Channel (RACH) usage, upload/download usage, traffic channel usage) in a portion of the network at a specified time of day and/or day of the week. As another example, the AAS may generate traffic models by comparing the volume of active communication messages by an application verses the volume of keepalive/heartbeat messages for that application. As yet another example, the AAS may generate traffic models to determine the network resources required to support the QoS requirements for all applications transmitting data in a geographic area over a specified period of time. As yet another example, traffic models may be created for a plurality of specified UE types (e.g. Huawei®, Apple®, Blackberry®, Samsung®, etc.) and/or operating systems (OS) (e.g. Windows®, Android®, iOS®) and OS versions. As such UE types and/or OSs change over time, new traffic models may be generated for the versions actively used in the network (e.g. old models may be phased out and new models generated/phased in as needed based on data actually collected by the network). The AAS may use the data from the traffic modeling to predict future network connection requirements. Upon completing step 502, the AAS may proceed to step 503. At step 503, the AAS may use the traffic models related to various applications to assign an application or applications to an application group and/or subgroup. For example, the AAS may assign applications to application groups/subgroups based on traffic models prediction of QoS and/or connection requirements. Also, an application may be assigned to multiple application groups/subgroups based on other predictive data such as projected usage at certain times of day. The AAS may also filter out any applications that do not require an interactive connection and/or assign such applications to a separate group. In addition or in the alternative, the AAS may create group assignment rules based on the traffic models, which may be transmitted to other devices, such as UEs, on request. The UEs may use the group assignment rules to perform application group/subgroup assignments. For example, the group assignment rules may indicate the group/subgroup to which an application should be assigned based on bandwidth, transmission/connection setup delay, whether consolidation, delay, or override of heartbeat signals is allowed, etc. The AAS may then proceed to step 504 and define connection parameters for application groups and/or subgroups. For example, the AAS may assign a shared transmission delay timer to each application group, which may force all applications assigned to the group to perform concurrent network signaling. Concurrent signaling by all applications in a group may reduce the number of transitions between MN idle and connected states. At step 505, the AAS may build and/or update an application database and a connection parameter database using the group/subgroup assignments of step 503 and the connection parameters of step 504, respectively. In addition or in the alternative, the AAS may transmit field data, traffic models, application group/subgroup assignments and/or connection parameters to the UE as needed.

For example, method 500 may result in assigning applications to a plurality of application groups and/or subgroups based on the historical behavior of a UE type, UE OS, UE/application RACH usage, UE/application signaling requirements, etc. Connection parameters may be assigned that are specific to each application group/subgroup. Connection parameters may be updated/changed over time (e.g. based on traffic models) to address specific network problems associated with specific application groups/subgroups. Application group/subgroup assignments may also be updated/changed over time based on the changing requirements and/or behaviors of the UE, network, and/or associated applications.

Figure 6:
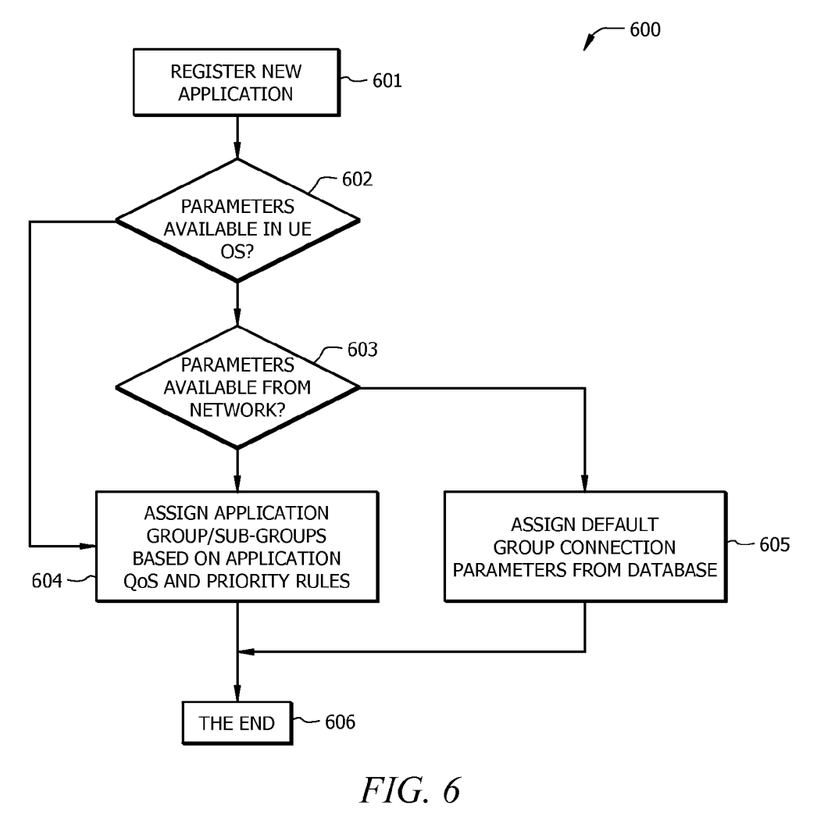
FIG. 6 is a flowchart of an embodiment of a method of registering an application in an application group.

FIG. 6 is a flowchart of an embodiment of a method 600 of registering an application in an application group, for example by a UE such as UE 110. At step 601, the UE may receive a new application and/or determine to register multiple applications executing on the UE. The UE may proceed to decision block 602 and attempt to obtain the QoS, priority, and/or other connection requirements for the application(s) from the UE's operating system (OS). The UE may proceed to step 604 if the connection requirements are available locally and step 603 if they are not. At decision block 603, the UE may request the connection requirements for the application(s) from a third party, for example from an AAS 123 and/or the network element acting as a server for the application. The UE may proceed to step 604 if the connection requirements are available and step 605 if they are not.

At step 604, the UE may filter out any applications that do not require an active connection. The UE may assign each application to a group/subgroup based on their connection requirements. Applications may also be assigned to group/subgroups based on group assignment rules, which may be received from the network upon request, periodically, or upon the occurrence of a specified event. For example, applications that require the UE to remain in a connected state while they are executing (e.g. online games, virtual terminals, online television (TV), VoIP, etc.) may be assigned to a connected application group. Applications that require periodic communications while they are executing, but allow the UE to operate in an idle state for periods of time (e.g. instant messaging, email programs, online news update, etc.) may be assigned to an idle application group. In addition or in the alternative, applications may be assigned to application groups based on other criteria such as RACH usage, radio link conditions, OS and/or OS version, etc. Applications may then be assigned to subgroups based on the applications connection requirements, such as QoS requirements, heartbeat requirements, etc., and assigned connection parameters commensurate with priority. For example, emergency and health services may receive the highest priority to access UE resources, other connected subgroups may be assigned priority based on QoS and/or other connection requirements, and idle groups/subgroup may be assigned lowest priority. Connection parameters for each group/subgroup may then be set based on group/subgroup priority. Upon completing step 604, the UE may proceed to step 606 and end the method. In addition or in the alternative, the UE may obtain field data, predictive models, application group/subgroup assignments, and/or connection parameters at decision blocks 602-603 (e.g. from an AAS), in which case such information may be used to perform local application group/subgroup and/or connection parameter assignments.

At step 605, the UE may be unaware of the connection parameters for an application(s). The UE may assign the application to a default application group and assign default connection parameters to the group. The default connection parameters may be preconfigured and stored in a database. In addition and/or in the alternative, the UE may assign the application to a subgroup and/or modify connection parameters based on any application information that is available to the UE.

Figure 7:
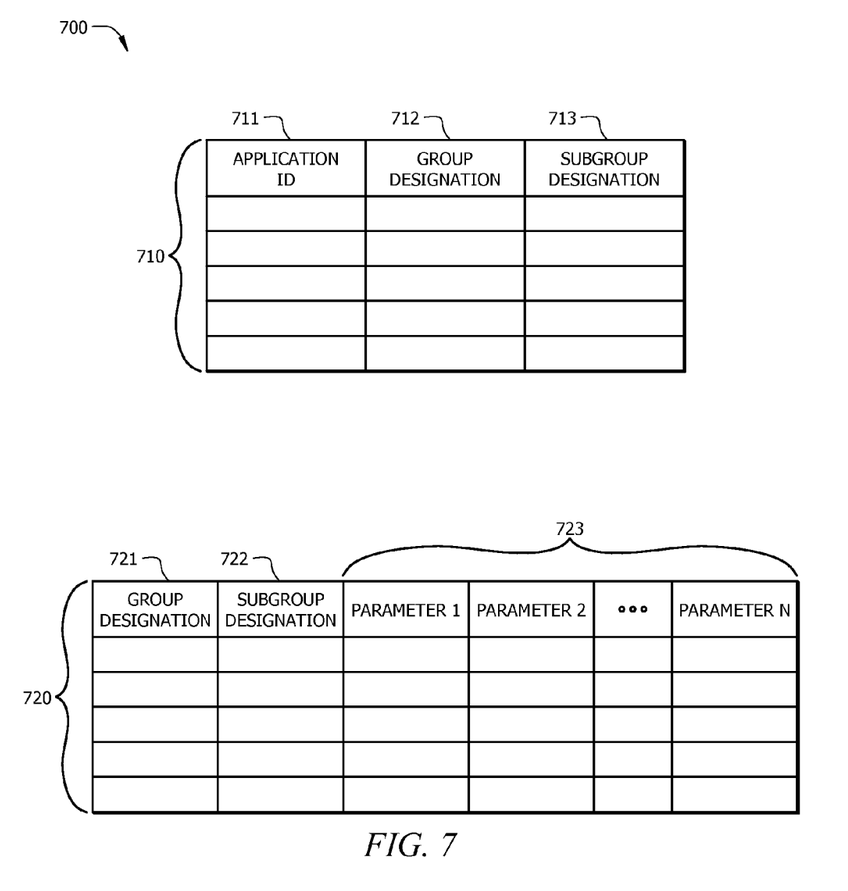
FIG. 7 is a schematic diagram of an embodiment of application group database.

FIG. 7 is a schematic diagram of an embodiment of application group database 700. The application group database 700 may be stored on an AAS, a UE, and/or on another network element. The application group database 700 may comprise an application group table 710 and a connection parameter table 720. The application group table 710 may be used to store application group and/or subgroup designations for each application. The connection parameter table 720 may be used to store connection parameters for each application group and subgroup. The application group database 700 and/or portions thereof may be transmitted to a UE periodically based on network timers, upon request by the UE, or based on an event. The database 700 may be updated periodically based on network timers, upon request by the UE, or based on an event.

The application group table 710 may comprise a plurality of rows, an application identification (ID) column 711, a group designation column 712, and a subgroup designation column 713. Each application in the application group table 710 may be designated by an identifier stored in a row of the application ID column. The group designation column 712 and the subgroup designation column 713 may be used to designate the application group and subgroup, respectively, of each application in the application ID column 711. The connection parameter table 720 may comprise a plurality of rows, a group designation column 721, a subgroup designation column 722, and a plurality of parameter columns 723. The parameter columns 723 may be used to store connection parameter values associated with an application group, an application subgroup, or both. The group designation column 721 and the subgroup designation column 722 may be used to identify the application group and/or subgroup to which the connection parameter values in the parameter columns 723 pertain.

Figure 8:
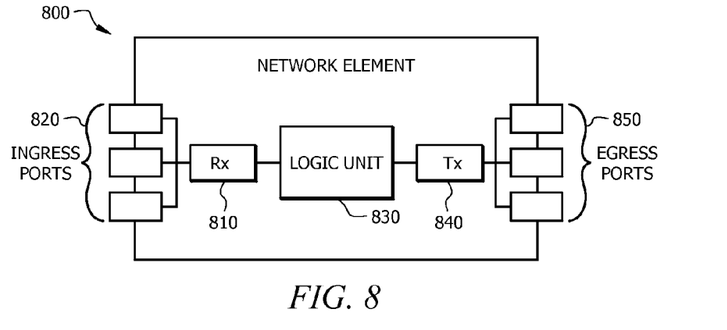
FIG. 8 is a schematic diagram of an embodiment of a network element (NE).

FIG. 8 is a schematic diagram of an embodiment of an NE 800, which may function as a node in network 100 and may be employed to implement a MME 122, an eNB 121, a Serving GW 131, a PDN GW 132, a PCRF 133, and/or an HSS 134. One skilled in the art will recognize that the term NE encompasses a broad range of devices of which NE 800 is merely an example. NE 800 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 800. For instance, the features/methods in the disclosure may be implemented using hardware, firmware, and/or software installed to run on hardware. The NE 800 may be any device that transports frames through a network, e.g., a switch, router, bridge, server, etc. As shown in FIG. 8, the NE 800 may comprise a receiver (Rx) 810 coupled to plurality of ingress ports 820 for receiving frames from other nodes, a logic unit 830 coupled to the receiver to determine which nodes to send the frames to, and a transmitter (Tx) 840 coupled to the logic unit 830 and to plurality of egress ports 850 for transmitting frames to the other nodes. The logic unit 830 may comprise one or more multi-core processors and/or memory devices, which may function as data stores. The ingress ports 820 and/or egress ports 850 may contain electrical and/or optical transmitting and/or receiving components. NE 800 may or may not be a routing component that makes routing decisions.

Figure 9:
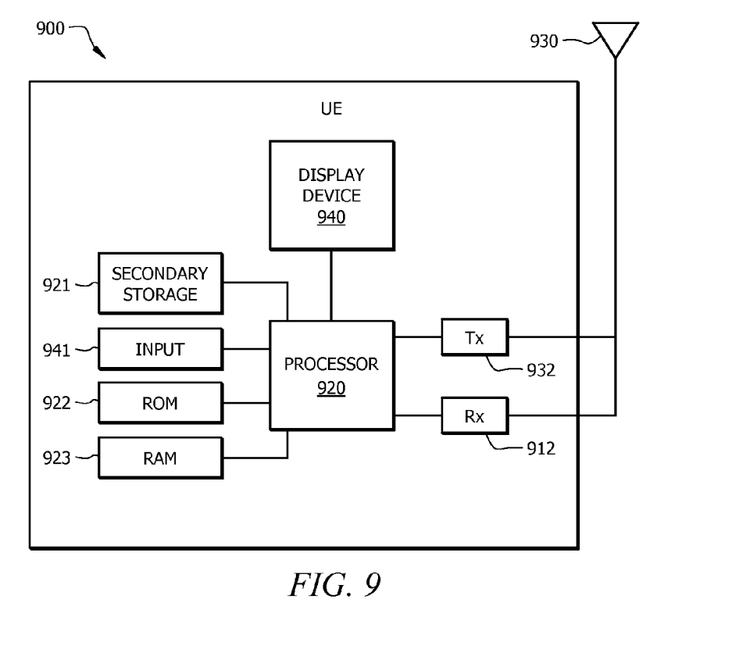
FIG. 9 is a schematic diagram of an embodiment of a UE.

FIG. 9 is a schematic diagram of an embodiment of a UE 900, which may be used to implement UE 110. UE 900 may comprise a two-way wireless communication device having voice and data communication capabilities. In some aspects, voice communication capabilities are optional. The UE 900 generally has the capability to communicate with other computer systems on the Internet. Depending on the exact functionality provided, the UE 900 may be referred to as a data messaging device, a two-way pager, a wireless e-mail device, a cellular telephone with data messaging capabilities, a wireless Internet appliance, a wireless device, a smart phone, a mobile device, or a data communication device, as examples.

UE 900 may comprise a processor 920 (which may be referred to as a central processor unit or CPU) that may be in communication with memory devices including secondary storage 921, read only memory (ROM) 922, and random access memory (RAM) 923. The processor 920 may be implemented as one or more CPU chips, one or more cores (e.g., a multi-core processor), or may be part of one or more application specific integrated circuits (ASICs) and/or digital signal processors (DSPs). The processor 920 may be configured to implement any of the schemes described herein, and may be implemented using hardware, software, firmware, or combinations thereof.

The secondary storage 921 may be comprised of one or more solid state drives and/or disk drives and is used for non-volatile storage of data and as an over-flow data storage device if RAM 923 is not large enough to hold all working data. Secondary storage 921 may be used to store programs that are loaded into RAM 923 when such programs are selected for execution. The ROM 922 may be used to store instructions and perhaps data that are read during program execution. ROM 922 may be a non-volatile memory device may have a small memory capacity relative to the larger memory capacity of secondary storage 921. The RAM 923 may be used to store volatile data and perhaps to store instructions. Access to both ROM 922 and RAM 923 may be faster than to secondary storage 921.

UE 900 may be any device that communicates data (e.g., packets) wirelessly with a network. The UE 900 may comprise a receiver (Rx) 912, which may be configured for receiving data, packets, or frames from other components. The receiver 912 may be coupled to the processor 920, which may be configured to process the data and determine to which components the data is to be sent. The UE 900 may also comprise a transmitter (Tx) 932 coupled to the processor 920 and configured for transmitting data, packets, or frames to other components. The receiver 912 and transmitter 932 may be coupled to an antenna 930, which may be configured to receive and transmit wireless (radio) signals.

The UE 900 may also comprise a device display 940 coupled to the processor 920, for displaying output thereof to a user. The device display 940 may comprise a Color Super Twisted Nematic (CSTN) display, a thin film transistor (TFT) display, a thin film diode (TFD) display, an organic light-emitting diode (OLED) display, an active-matrix OLED display, or any other display screen. The device display 940 may display in color or monochrome and may be equipped with a touch sensor based on resistive and/or capacitive technologies.

The UE 900 may further comprise input devices 941, coupled to the processor 920, which may allow the user to input commands to the UE 900. In the case that the display device 940 comprises a touch sensor, the display device 940 may also be considered an input device 941. In addition to and/or in the alternative, an input device 941 may comprise a mouse, trackball, built-in keyboard, external keyboard, and/or any other device that a user may employ to interact with the UE 900.

While the embodiments of apparatuses and methods discussed herein are largely discussed in the context of an LTE network, it should be noted that implementation of such embodiments in other networks is equally feasible. Such networks include, without limitation, Institute of Electrical and Electronics Engineers (IEEE) standard 802.11 network (Wi-Fi), wireless local area networks (WLAN), code division multiple access (CDMA), universal mobile telecommunications system (UMTS), world-wide interoperability for microwave access (WiMAX), and other networks.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A user equipment (UE) comprising:
    a transmitter configured to transmit data from a network; and
    a processor coupled to the transmitter and configured to:
        execute an application that performs signaling with a wireless network via the transmitter;
        determine that the application is one of a plurality of applications assigned to an application group based on signaling requirements of the application; and
        determine that the application group is associated with a shared maximum bandwidth that limits network signaling of all applications in the application group;
        initiate one or more network signaling links for the applications assigned to the application group; and discontinue transmissions for all applications assigned to the application group upon reaching the shared maximum bandwidth.

2. The UE of claim 1, wherein the processor is configured to execute the plurality of applications via the transmitter, wherein the processor is further configured to assign the plurality of applications to the application group based on signaling requirements of the applications and associate the shared maximum bandwidth with the application group.

3. The UE of claim 2, wherein applications that require the UE to remain in a connected state while executing are assigned to a connected application group, and wherein applications that allow the UE to operate in an idle state while executing are assigned to an idle application group.

4. The UE of claim 2, wherein applications are assigned to at least one of a plurality of application subgroups that are each associated with a connection parameter that limits network signaling of all applications in the subgroup, and wherein the connection parameters assigned to the application subgroups grant each of the application subgroups varying priority.

5. The UE of claim 2, wherein the UE assigns at least one of the applications to an application group based on group assignment rules received from the wireless network.

6. The UE of claim 2, wherein the application group assignments and the shared maximum bandwidth are received by the UE via the wireless network.

7. The UE of claim 2, wherein the processor is configured to allow a user to create an application group, create application group assignment rules, or combinations thereof, and wherein the UE assigns applications to the application group created by the user according to the application group assignment rules.

8. The UE of claim 7, wherein the processor is configured to update an application group assignment rule, an application group assignment, or a connection parameter, and wherein the update is not received from the wireless network.

9. The UE of claim 2, wherein the processor is further configured to negotiate with a network element to update the application group assignment and the associated shared maximum bandwidth.

10. The UE of claim 1, wherein the application signaling requirements comprise radio link conditions.

11. The UE of claim 1, wherein the application signaling requirements comprise application bandwidth requirements, transmission setup delay, connection setup delay, and heartbeat signaling requirements.

12. The UE of claim 4, wherein the connection parameters comprise a shared maximum bandwidth, transmission consolidation rule, a shared application heartbeat limitation, or a shared transmission delay timer.

13. A communication device comprising:
a memory, configured to store an application group database including an application group and a connection parameter associated with the application group; and
a processor, configured to:
obtain a plurality of predictive traffic models for a plurality of applications, wherein each predictive traffic model estimates a future impact signaling by the associated application will have on a portion of a network at a specified time based on historical measurements of past signaling by the associated application;
use the predictive traffic models related to the applications to assign the applications to the application groups; and
assign at least one connection parameter to the application groups,
wherein the connection parameter limits network signaling of all the applications assigned to the group to which the connection parameter pertains.

14. The communication device of claim 13, wherein the processor is further configured to obtain group assignment rules based on the predictive traffic models, wherein the group assignment rules are used to assign the applications to the application groups.

15. The communication device of claim 13, wherein the processor is further configured to update the predictive traffic models, group assignment rules, and the connection parameters.

16. The communication device of claim 15, wherein the applications are assigned to the application groups based on priority requirements.

17. The communication device of claim 13, wherein the predictive traffic models estimate signaling impact based on a type of user equipment (UE), a UE operating system (OS), or impact of the application on network radio link conditions.

18. The communication device of claim 13, wherein the processor is further configured to disable network initiated signaling to at least one of the applications.

19. A method comprising:
assigning a plurality of applications that perform network signaling when executed by a user equipment (UE) to a plurality of application groups based on signaling requirements of the applications;
assigning to each application group at least one connection parameter that limits network signaling of all applications assigned to the application group; and
storing the application group assignments and the connection parameter assignments in an application group database,
wherein the application group assignments and the connection parameter assignments are updated periodically or upon the occurrence of a specified event based on data generated by predictive traffic models that estimate a future impact signaling by the associated applications will have on a portion of a network at a specified time based on historical measurements of past signaling by the associated applications.

20. The method of claim 19, wherein the application group database is stored in the UE or a network element to which the UE is wirelessly connected.

21. The method of claim 19, wherein the application signaling requirements comprise radio link conditions, application bandwidth requirements, transmission setup delay, connection setup delay, or heartbeat signaling requirements.

22. The method of claim 19, wherein the connection parameters comprise a shared transmission delay timer, and wherein network signaling links for the applications in a common application group are initiated upon expiration of the associated shared transmission delay timer.

23. The communication device of claim 15, wherein the updates are performed periodically, upon request, or upon the occurrence of a specified event.

* * * * *